C. N. ARMFIELD.
SPINDLE OILER.
APPLICATION FILED APR. 23, 1912.
1,060,881.
Patented May 6, 1913.
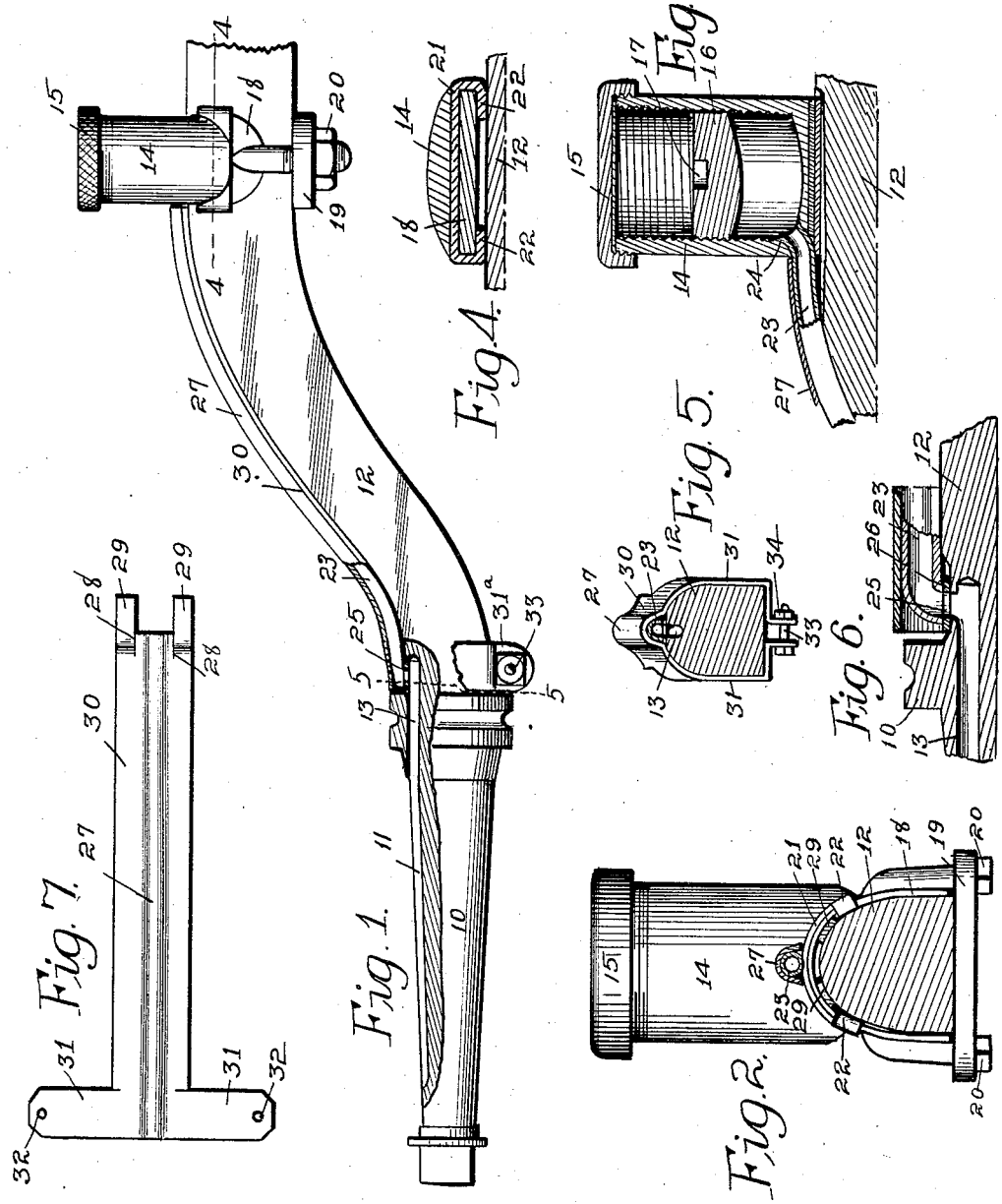
Witnesses
A. G. Hague
W. A. Loftus
Inventor
Charles N. Armfield
by Orwig & Bair attys

UNITED STATES PATENT OFFICE.

CHARLES N. ARMFIELD, OF GUTHRIE CENTER, IOWA.

SPINDLE-OILER.

1,060,881. Specification of Letters Patent. Patented May 6, 1913.

Application filed April 23, 1912. Serial No. 692,728.

*To all whom it may concern:*

Be it known that I, CHARLES N. ARMFIELD, a citizen of the United States, residing at Guthrie Center, in the county of Guthrie and State of Iowa, have invented a new and useful Spindle-Oiler, of which the following is a specification.

The object of my invention is to provide a spindle oiler of simple, durable, and inexpensive construction, whereby grease may be conducted from the grease cups to spindles through tubes which are thoroughly protected from blows or the like.

A further object is to provide a spindle oiler having a tube leading from a grease cup to the spindle, which tube is made of flexible material so that it can be readily bent to conform to the shape of the axle.

A further object is to provide for such a tube, a protecting shield, strong enough to protect the tube from any ordinary blow which it is likely to receive and yet sufficiently flexible to be readily bent to conform to the shape of the axle.

A further object is to make such a protecting shield having parts so constructed and arranged that the shield may be quickly and easily installed on an axle or removed therefrom.

A further object is to make such a protecting shield in such form that it can be built in a standard length and may be readily cut down to protect grease tubes of various lengths.

My invention consists in certain details, in the arrangement, construction, and combination of the various parts of my device, whereby the objects contemplated are attained, as hereinafter more fully set forth, pointed out in my claims, and illustrated in the accompanying drawings, in which—

Figure 1 shows a side elevation partly in section, of my improved spindle oiler, installed on an axle. Fig. 2 shows an end elevation of a grease cup, the tube, shield, and axle being shown in section. Fig. 3 shows a vertical, sectional view of a grease cup, grease tube, shield and axle. Fig. 4 shows a detail, sectional view taken on the line 4—4 of Fig. 1. Fig. 5 shows a detail, sectional view taken on the line 5—5 of Fig. 1. Fig. 6 shows a vertical, sectional, longitudinal view through the spindle and axle, at the point where the grease tube discharges upon the spindle. Fig. 7 shows a plan view of the protecting shield before it is attached to the axle.

In the accompanying drawings I have used the reference numeral 10 to indicate a vehicle spindle of ordinary construction, which is provided with the ordinary oil receiving groove 11 on its upper side. The spindle is mounted on an upwardly curved axle 12. I prepare the spindles for use with my improved spindle oiler by drilling a horizontal opening 13 in the axle in line with the groove 11. On the axle 12 at a point spaced inwardly from the spindle, I mount a grease cup which is indicated generally in Fig. 1 by the reference numeral 14. The upper outer end of the grease cup is screwthreaded and is provided with a detachable screwthreaded cap 15. The interior of the grease cup 14 is also screwthreaded and mounted in said interior is an externally screwthreaded plug 16 having in its upper side an angular opening 17 designed to receive the angular head of a wrench by which the plug 16 is screwed upwardly or downwardly within the grease cup 14. At the lower end of the grease cup 14, on one side thereof, is an opening which is somewhat larger at its inner end than at its outer end, as shown in Fig. 3.

The grease cup 14 is mounted on the axle 12 in the following manner: The bottom of the grease cup 14 is provided with an upwardly curved recess as shown in Fig. 2, designed to conform in shape to the upper surface of the axle 12. On the axle 12 is an inverted U shaped bracket 18 of ordinary construction, the lower ends of which are screwthreaded. Mounted on the lower ends of the bracket 18, beneath the axle 12, is a cross bar or plate 19 which is held on the bracket 18 by means of nuts 20 on the ends of said bracket. Soldered to the under side of the grease cup 14 is an inverted U shaped plate 21 which has near each end, opposite extensions 22 which are folded around the edges of the bracket 18 and rest between said bracket and the axle, as shown in Figs. 2 and 4.

In assembling the parts of my device, the plate 21 is soldered to the grease cup 14, the extensions 21 are then bent around the sides or the edges of the bracket 18, and the bracket is then placed on the axle. Before securing the bracket 18 tightly upon the axle, the protecting shield 30, hereinafter described, is mounted on the axle.

For conducting the grease from the grease cup 14 to the spindle, I have provided a tube 23, preferably made of somewhat flexible material, such as copper. One end of the tube 23 is inserted in the opening in the lower end of the grease cup 14, and is flared at 24 as shown in Fig. 3. The shape of the opening in the lower part of the grease cup 14 and the flaring of the end of the tube 23 firmly connects the tube 23 and the grease cup. The tube 23 is laid along the upper side of the axle and extended to a point above the inner end of the opening 13. In the axle above the inner end of the opening 13, is a hole 25 and the outer end of the tube 23 is bent so that the opening in the outer end of said tube registers with the opening 25 as shown in Fig. 6.

Between the outer end of the tube 23 and the portion of the axle in which the opening 25 is formed, I preferably mount a washer 26. For protecting the tube 23, which, for the reason that it is necessary to mount such tubes on axles of different forms, is made of comparatively flexible material and is therefore somewhat soft, I provide a protecting shield 30, which is shown in blank in Fig. 7. The main body of the shield 30 is made of a substantially rectangular plate, preferably of sheet metal, which can be readily bent, having a central, longitudinal upwardly extending groove 27. In one end of the shield 30, I cut parallel longitudinal slits 28 spaced apart from the groove 27 as shown in Fig. 7. I then cut away part of the central portion of the shield 30 between the slits 28, leaving opposite tongues or extensions 29. The extensions 29, at their inner ends are bent downwardly and then extended in a plane parallel with the plane in which the main body of the shield 30 lies. At the other end of the shield 30 I provide opposite laterally extending wings 31, in the outer ends of which are openings 32.

My protecting shield 30 is installed on an axle with the tube 23 received in the groove 27. The upper or inner end of the shield on which are formed the extensions 29, is placed adjacent to the grease cup 14 with the extensions 29 received beneath the bracket 18 and between the extensions 22 on the plate 21, as shown in Fig. 2. It will thus be seen that the upper, inner end of the shield 30 is securely fastened on the axle without interfering with the extensions 22. The outer end of the shield 30 rests above the outer end of the tube 23. The wings 31 are bent downwardly around the axle and are of sufficient length to permit their ends to be bent outwardly from the lower side of the axle as shown in Fig. 1, forming approximately adjacent ears 31ª. A bolt 33 is extended through the openings 32 and is secured to the ears 31ª of the wings 31.

The practical instalment and operation of my improved spindle oiler is as follows: The plate 21 is secured by soldering or in some other suitable way to the lower surface of the grease cup 14. The extensions 22 are bent around the edges of the bracket 18 as shown in Figs. 2 and 4. The inner end of the tube 23 is then extended into the opening in the lower part of the grease cup and is flared somewhat to prevent its removal from the grease cup. The bracket 18, the grease cup, and the tube 23 are then placed in position on the axle and the tube 23 is bent to conform to the shape of the axle. The outer end of the tube 23 is bent downwardly to register with the opening 25 and is then cut on a horizontal line, the washer 26 is placed in position, the shield 30 is placed above the tube 23 and the extensions 29 are inserted beneath the bracket 18 upon the axle between the extensions 22. The bracket 18 is then secured firmly in position by means of the cross bar 19 and the nuts 20. The wings 31 are bent around the axle 12, the ears 31ª are formed, and are secured together by means of the bolt 33 and the nut 34. The cap 15 and the plug 16 are removed from the grease cup and the latter is filled with grease. The plug is then placed in the cup and screwed downwardly until grease is forced through the tube 23 and the lower end thereof. The cap 15 is then placed in position on the grease cup. After the vehicle has been run a certain length of time, the plug 16 can be screwed deeper into the grease cup 14 and more grease forced to the spindle.

The advantages of my improved spindle oiler are seen from the foregoing description.

The parts are of simple and inexpensive construction. The brackets 18 are found on many ordinary vehicles. The plate 21 is made of somewhat flexible material so that it may be readily bent to conform to the shape of the axle. The tubes 23 may be made in any length desired and may be readily cut to fit any particular vehicle. The protecting shields 30 may be made of a maximum length and may be shortened to fit any vehicle by cutting off the inner end, forming new slits 28, cutting away the central portion of the shield 30 between the slits, and forming the shoulders at the inner ends of the extensions 29.

My oiler is readily and easily attached to any vehicle and may be quickly removed.

The parts may be cheaply replaced when out of repair.

I claim as my invention:

1. In a device of the class described, the combination of an axle having a spindle thereon, with a grease cup on said axle, with a tube leading from the cup to the spindle and a protecting shield for said tube, comprising a substantially rectangular plate of strong and somewhat flexible material, said plate having a longitudinal upwardly extending groove formed therein, to receive said tube and opposite laterally extending side wings formed on said protector at one end thereof designed to be extended around an axle, said plate being formed with longitudinal slits at its other end, spaced inwardly from the outer edges of said plate and located on opposite sides of said groove, the portion of said plate between said slits being cut away.

2. In a device of the class described, the combination of an axle having a groove therein with a shield for said groove comprising a substantially rectangular plate of strong and somewhat flexible material, said plate having a longitudinal upwardly extending groove formed therein, and opposite laterally extending side wings formed on said shield at one end thereof, said plate being formed with longitudinal slits at its other end, spaced inwardly from the outer edges of said plate and located on opposite sides of said groove, the portion of said plate between said slits being cut away.

3. In a device of the class described, the combination of an axle having a groove therein with a shield for said groove comprising a substantially rectangular plate of strong and somewhat flexible material, said plate having a longitudinal upwardly extending groove formed therein, and opposite laterally extending side wings formed on said shield at one end thereof, said plate being formed with longitudinal slits at its other end, spaced inwardly from the outer edges of said plate and located on opposite sides of said groove, the portion of said plate between said slits being cut away, the tongues or extensions thereby formed being bent to form downwardly extending shoulders at the point where they are joined to said plate, and extending from said shoulders in a plane parallel with that in which the plate lies.

Des Moines, Iowa, April 8, 1912.

CHARLES N. ARMFIELD.

Witnesses:
N. K. DEWEY,
FRANK C. WEBB.

Copies of this patent may be obtained for five cents each, by addressing the "Commissioner of Patents, Washington, D. C."